(12) United States Patent
Giri et al.

(10) Patent No.: US 11,485,852 B2
(45) Date of Patent: Nov. 1, 2022

(54) HIGH IMPACT RESISTANT POLY(LACTIC ACID) BLENDS

(71) Applicant: NORTHERN TECHNOLOGIES INTERNATIONAL CORPORATION, Circle Pines, MN (US)

(72) Inventors: Preetam Giri, Midland, MI (US); Shilpa Manjure, Woodbury, MN (US); Sayli Bote, Saint Paul, MN (US)

(73) Assignee: Northern Technologies International Corporation, Circle Pines, MN (US)

( * ) Notice: Subject to any disclaimer, the term of this patent is extended or adjusted under 35 U.S.C. 154(b) by 281 days.

(21) Appl. No.: 16/793,529

(22) Filed: Feb. 18, 2020

(65) Prior Publication Data
US 2021/0253849 A1  Aug. 19, 2021

(51) Int. Cl.
 *C08L 67/04* (2006.01)
 *B29C 48/405* (2019.01)
 (Continued)

(52) U.S. Cl.
 CPC ............ *C08L 67/04* (2013.01); *B29C 48/405* (2019.02); *C08G 77/42* (2013.01); *C08G 81/00* (2013.01);
 (Continued)

(58) Field of Classification Search
 CPC ........ C08G 81/00; C08G 77/42; C08L 87/005
 See application file for complete search history.

(56) References Cited

U.S. PATENT DOCUMENTS 5,252,642 A * 10/1993 Sinclair ................... A61L 15/26
                                                    524/108
5,643,681 A *  7/1997 Voorhees ................ C08L 67/04
                                                    428/315.5

(Continued)

OTHER PUBLICATIONS

Yu et al. (Polymer Engineering and Science, 2008, p. 634-641) (Year: 2008).*

(Continued)

*Primary Examiner* — Liam J Heincer
(74) *Attorney, Agent, or Firm* — Hudak, Shunk & Farine Co. LPA (57) ABSTRACT

The notched Izod impact toughness and tensile elongation of poly(lactic acid) (PLA)-homopolymers are increased by about 2 to about 4 times by blending therewith a PLA-copolymer having a difunctional flexible middle segment such as a polysiloxane or a polyether from about 0.6 wt. % to about 20 wt. %. The PLA-homopolymer-PLA-copolymer blend having a difunctional flexible polymer from about 0.5 wt. % to about 10 wt. % is thermally annealed to provide impact toughness of at least about 5 kJ/m$^2$ and tensile elongation of greater than 12%. This exceptional improvement observed in the PLA blend is a synergistic effect of the addition of the difunctional flexible polymer of the copolymer and thermal annealing. The improvement observed in the mechanical properties with high PLA homopolymer content above about 90 to about 98 wt. % is unusual and results in an increased scope of molding and thermoforming applications. The annealed PLA-copolymers having a difunctional flexible middle segment have also been found to have improved notched Izod impact properties.

25 Claims, 2 Drawing Sheets

(51) Int. Cl.
*C08L 53/00* (2006.01)
*B29K 67/00* (2006.01)
*C08G 77/42* (2006.01)
*C08G 81/00* (2006.01)
*C08L 87/00* (2006.01)

(52) U.S. Cl.
CPC ............ *C08L 53/005* (2013.01); *C08L 87/005* (2013.01); *B29K 2067/046* (2013.01)

(56) References Cited

U.S. PATENT DOCUMENTS

| | | | | |
|---|---|---|---|---|
| 5,756,651 | A * | 5/1998 | Chen | C08L 67/04 523/124 |
| 6,004,573 | A * | 12/1999 | Rathi | A61K 47/34 424/426 |
| 8,603,636 | B2 * | 12/2013 | Kani | B44C 3/02 428/423.1 |
| 2010/0144971 | A1 * | 6/2010 | Babcock | C08L 67/04 525/64 |
| 2011/0313114 | A1 * | 12/2011 | Soyama | C08G 81/00 525/450 |
| 2013/0017189 | A1 * | 1/2013 | Pierre | A61K 9/0024 424/130.1 |
| 2013/0066024 | A1 * | 3/2013 | Kim | C08G 77/42 525/474 |
| 2014/0004330 | A1 * | 1/2014 | Yoo | C08G 18/48 428/220 |
| 2014/0205638 | A1 * | 7/2014 | Oh | C08G 65/08 424/400 |
| 2015/0274898 | A1 * | 10/2015 | Sohn | C08G 18/4887 525/411 |
| 2015/0284516 | A1 * | 10/2015 | Sohn | C08G 63/823 525/418 |
| 2016/0303279 | A1 * | 10/2016 | Hsu | A61L 27/18 |
| 2017/0198089 | A1 * | 7/2017 | Chung | C08G 18/48 |
| 2017/0359965 | A1 * | 12/2017 | Kratz | C08L 67/04 |
| 2020/0172680 | A1 * | 6/2020 | Choi | C08G 81/00 |
| 2020/0283622 | A1 * | 9/2020 | Kim | C08G 12/20 |

OTHER PUBLICATIONS

Kfoury, G., et al., Recent advances in high performance poly(lactide): from "green" plasticization to super-tough materials via (reactive) compounding, Frontiers in Chemistry, 2013, vol. 1, Article 32, pp. 1-46.

Pillin, I,, et al., Thermo-mechanical characterization of plasticized PLA: Is the miscibility the only significant factor?, Polymer, 2006, vol. 47, pp. 4676-4682, Elsevier Ltd, Science Direct.

Anderson, K., et al., Toughening Polylactide, Polymer Reviews, 2008, vol. 48, No. 1, pp. 85-108, Taylor & Francis Group.

Rashkov, N., et al., Synthesis Characterization, and Hydrolytic Degradation of PLA/PEO/PLA Triblock Copolymers with Short Poly(L-lactic acid) Chains, Macromolecules, 1996, vol. 29, pp. 50-56, American Chemical Society.

Colas, A., Silicones: Preparation, Properties and Performance, Dow Corning, Life Sciences, 2005, pp. 1-14, Dow Corning Corporation.

Rodwogin, M., et al., Polylactide-Poly(dimethylsiloxane)-Polylactide Triblock Copolymers as Multifunctional Materials for Nanolithographic Applications, ASC Nano, 2010, vol. 4, No. 2, pp. 725-732.

Taskin, E., et al., Synthesis of Some Novel Blends of Polylactide with Polylactide-b-Poly(ethylene glycol) Block Copolymers, Journal of Macromolecular Science, Part A: Pure and Applied Chemistry, 2012, vol. 49, pp. 164-170, Taylor & Francis Group, LLC.

Hazer, B., et al., Synthesis of Polylactide-b-Poly (Dimethyl Siloxane) Block Copolymers and Their Blends with Pure Polylactide, Journal Polymer Environment, 2012, vol. 20, pp. 477-484, Springer Science+Business Media, LLC.

Wu, M., et al., Simultaneous the termodynamics favorable compatibility and morphology to achieve excellent comprehensive mechanics in PLA/OBC blend, Polymer, 2014, vol. 55, pp. 6409-6417, Elsevier Ltd.

Deng, L., et al., Supertoughened Polylactide Binary Blend with High Heat Deflection Temperature Achieved by Thermal Annealing above the Glass Transition Temperature, ACS Sustainable Chemistry & Engineering, 2018, vol. 6, pp. 480-490, ACS Publications.

* cited by examiner

HIGH IMPACT RESISTANT POLY(LACTIC ACID) BLENDS

FIELD OF THE INVENTION

The notched Izod impact toughness and tensile elongation of poly(lactic acid) (PLA)-homopolymers are increased by about 2 to about 4 times by blending therewith a Poly(lactic acid)-copolymer (PLA-copolymer) having a difunctional flexible middle segment such as a polysiloxane or a polyether in an amount of from about 0.6 wt. % to about 20 wt. % of the copolymer. The PLA-homopolymer-PLA-copolymer blend having therein the difunctional flexible polymer in an amount of from about 0.5 wt. % to about 10 wt. % is thermally annealed to provide impact toughness of at least about 5 kJ/m$^2$ and tensile elongation of greater than 12%. This exceptional improvement observed in the PLA blend is a synergistic effect of the addition of the difunctional flexible polymer of the PLA-copolymer and thermal annealing. The improvement observed in the mechanical properties with high PLA content above about 90 wt. % to about 98 wt. % is unusual and results in an increased scope of molding and thermoforming applications. Moreover, annealed PLA-copolymers having a difunctional flexible middle segment in an amount of from about 0.5 wt. % to about 10 wt. % based upon the total weight of the copolymer also have improved notched Izod impact toughness.

BACKGROUND OF THE INVENTION

The demand for single-use plastics such as polyethylene, polypropylene, polyester, and polystyrene has increased tremendously in the past few years. This plastic waste ends up in landfill where it takes many years to decompose or in oceans affecting marine life. One viable option to reduce the accumulation of plastic waste is with proper collection of organic recycling using compostable plastics. Some examples of compostable plastics are poly(lactic acid) (PLA), poly(butylene adipate-co-terephthalate) (PBAT), and polycaprolactone (PCL). Amongst these thermoplastics, poly(lactic acid) (PLA) is the most widely used, commercially available biobased and biodegradable polymer. PLA is widely used for single-use products such as bags, cutlery, and containers etc. as it is a completely renewable and compostable material. PLA has good mechanical properties including tensile strength (above about 60 MPa) and modulus (about 3.4 GPa) within the range of polystyrene (PS). However, its high rigidity and low toughness (notched Izod impact strength of PLA is about 4 kJ/m$^2$ as compared to high-impact polystyrene (HIPS) of from about 7 to about 13 kJ/m$^2$) limit its application in thermoformed sheets and other molding applications that today use (HIPS) and other high toughness polymers. Also, it has lower elongation compared to the other thermoplastics such as polyethylene terephthalate (PET) and polypropylene (PP) which limits its application. The presence of the ester linkages in PLA makes it susceptible to hydrolytic degradation. These disadvantages of PLA are usually overcome by (1) blending it with plasticizers, (2) blending it with other flexible and biodegradable polymers, or (3) blending it with poly(lactic acid) or lactide based copolymers which can also be used as a compatibilizer with immiscible polyesters. In a first approach, polyethylene glycol (PEG) is commonly used as a plasticizer as well as toughening agent for PLA. In a second approach, PLA is blended with high toughness compostable polyesters such as poly(butylene adipate-co-terephthalate) (PBAT), and other compostable polyesters such poly(butylene succinate) (PBS), poly(butylene succinate-co-adipate) (PBSA), and polycaprolactone (PCL), which is a fairly common practice to improve its mechanical performance without compromising its biodegradability. However, a significant amount (>20 wt. %) of these polyesters is required to see substantial improvement in the performance properties. The blending of polymers often needs compatibilizers to prevent the phase separation over time.

In a third approach, the mechanical properties of PLA is improved by using a PLA-based copolymer as an impact modifier. It can be synthesized using lactide or PLA as a starting material. The introduction of flexible segments like siloxane (Si—O—Si) or ether (C—O—C) in the PLA matrix could increase the ductility of PLA as well as its impact toughness. Polydimethylsiloxane (PDMS) has an extremely flexible Si—O—Si backbone with the glass transition temperature around $-120°$ C. that should make a ductile product upon the incorporation of PDMS in PLA. However, PLA and PDMS are incompatible with each other due to their difference in solubility parameters, which hinders their miscibility. Thus, the direct blending of PLA and PDMS does not give the desired improvement in mechanical properties.

In previous work, PLA-PDMS and PLA-PEG copolymers were synthesized by reacting amine-terminated PDMS or PEG with PLA in a chloroform solution at a temperature of about $60°$ C. to about $70°$ C. The methanol was added after reaction to precipitate copolymer and PLA, leaving unreacted PDMS or PEG in solvent phase. This process involves a separation step that generally is not a viable option for commercializing the copolymer.

SUMMARY OF THE INVENTION

To eliminate the separation step and make it feasible for commercialization, PLA-PDMS copolymers of the present invention were synthesized using a novel and preferred technique. PDMS is available with hydroxyl (OH) end-group as well as with amine ($NH_2$) end-group. Amino groups are highly reactive towards ester bonds compared to the hydroxyl groups that are more reactive than epoxy groups. Thus, amine-functionalized PDMS is preferred and was chosen for the PLA-copolymer synthesis. The PLA-copolymer was synthesized using different grades of PLA. The PLA-homopolymer-PLA-copolymer blends of different amounts of PLA-copolymer, containing a flexible segment, in neat PLA were used for injection molding. The effect of the increasing amount of PDMS on the mechanical performance of PLA-homopolymer-PLA-copolymer blends was studied. The percent crystallinity of injection molded samples was increased by a unique thermal annealing process which unexpectedly yielded an increase in the performance properties of PLA-homopolymer-PLA-copolymer blends having high amounts of PLA homopolymer content of from about 90 wt. % to about 98 wt. %. The annealed PLA-copolymer per se has also been found to have improved Izod notched impact strength properties.

DETAILED DESCRIPTION OF THE INVENTION

The composition and process of the present invention that have several favorable aspects are blends of a melt-processable poly(lactic acid) (PLA) homopolymer and a FLA-copolymer made from PLA and a difunctional flexible polymer having highly flexible Si—O—Si or C—O—C linkages. Some of such notable aspects include improved tensile elongation at break according to ASTM D638-14 of at least about 10% to about 120%, desirably from about 13% to about 50%, and preferably from about 13% to about 27%. Improved notched Izod impact is obtained of at least 5 kJ/m$^2$ to about 30 kJ/m$^2$, desirably at least about 6 kJ/m$^2$ to about 20 kJ/m$^2$, and preferably at least about 7 kJ/m$^2$ to about 12 kJ/m$^2$ according to ASTM D256. The PLA homopolymer is commercially available. Semi-crystalline grades of poly (lactic acid) (PLA) generally have a number average molecular weight of from about 50,000 to about 150,000, desirably from about 60,000 to about 120,000, and preferably from about 60,000 to about 100,000 g/mol. The weight average molecular weight is from about 100,000 to about 300,000; desirably from about 110,000 to about 250,000, and preferably from about 120,000 to about 180,000 g/mol. With respect to the present invention, the molecular weights of the PLA polymers as well as the other polymers set forth herein is determined by Gel Permeation Chromatography (GPC) using polystyrene standards, a refractive index detector, and tetrahydrofuran (THF) as the solvent. The D-lactide content of semi-crystalline grades of PLA is from about 0.1 to about 5; desirably from about 0.3 to about 2, and preferably from about 0.4 to about 1.6 wt. %.

The invention will be better understood by reference to the following examples which serve to illustrate but not to limit the invention as claimed hereinafter.

EXAMPLES

Materials

Commercially available semi-crystalline grades of poly (lactic acid) (PLA) homopolymer, for example Ingeo™ biopolymer 3001D ($M_n$=90,000) and 3100HP ($M_n$=90,000) were purchased from NatureWorks LLC (Minnesota, USA). The D-lactide amount of PLA 3001 D was about 1.4 wt. % and the D-lactide amount of PLA 3100HP was about 0.5 wt. %. The transesterification catalyst, e.g. tin (II)-ethylhexanoate (Sn(Oct)$_2$) was purchased from Sigma-Aldrich (Wisconsin, USA). Aminopropyl terminated polydimethylsiloxane (NHPDMS) that can have a broad weight average molecular weight of from about 2,000 to about 50,000, desirable from about 10,000 to about 40,000, and preferably from about 25,000 to about 35,000 g/mol. A NHPDMS of molecular weight 30,000 g/mol was utilized as purchased from Gelest Inc. (Pennsylvania, USA). The weight average molecular weight of the various polyethers is from about 2,000 to about 40,000 and desirably from about 4,000 to about 20,000. The amount of the difunctional flexible middle segment utilized was generally from about 0.6 wt. % to about 20 wt. %, desirably from about 0.6 wt. % to about 10 wt. %, and preferably from about 0.6 wt. % to about 5 wt. % in the PLA-copolymer, and the amount of the PLA segment of the PLA-copolymer was the difference to add up to 100 wt. %, that is from about 80 wt. % to about 99.4 wt. %; desirably from about 90 wt. % to about 99.4 wt. %, and preferably from about 95 wt. % to about 99.4 wt. %. Suitable amounts of PLA-copolymer containing these difunctional flexible segments were added to PLA-homopolymers to form PLA-homopolymer-PLA-copolymer blends that generally contained from about 0.5 wt. % to about 10 wt. %, desirably from about 0.5 wt. % to about 5 wt. %, and preferably from about 1 wt. % to about 2 wt. %, of the difunctional flexible polymer in the of PLA-homopolymer-PLA-copolymer blend. Thus, the difference (PLA-polymer) was the amount to add up to 100 wt. %, that is from about 90 wt. % to about 99.5 wt. %; desirably from about 95 wt % to about 99.5 wt. %, and preferably from about 98 wt. % to about 99 wt. %. The amount of PLA-homopolymer that is to be added to the PLA-copolymer can be readily calculated to yield a lower amount of the difunctional flexible middle segment in the final PLA-homopolymer-PLA-copolymer blend by simple mathematics. For example, if the amount of the difunctional flexible segment in the final blend is desired to be about 7 wt. % and the amount of the difunctional flexible segment in the PLA-copolymer per se is 14%, all that is required is the addition of an amount of the PLA-homopolymer that is equal to the amount of the PLA-copolymer.

Methods

The aminopropyl terminated polydimethylsiloxane, a difunctional flexible polymer, was thermally reacted with PLA to form the PLA-copolymer using a facile technique e.g. reactive extrusion herein below described. Reaction temperatures to form the PLA-copolymer were from about 140° C. to about 220° C., desirably from about 160° C. to about 190° C. and preferably from about 170° C. to about 185° C. Since PLA is susceptible to hydrolytic degradation, especially in the presence of elevated temperatures and shear forces in an extruder, the PLA pellets were dried at 55° C. in a vacuum oven for at least 12 hours before being used. The PLA-copolymer was synthesized using 3001 D as well as 3100HP. The 5 wt. % of NHPDMS and 0.1 wt. % of a suitable catalyst known to the literature and to the art, such as tin (II)-ethylhexanoate were premixed with 95 wt. % of PLA pellets before being fed into the hopper. A Lab Tech Scientific LTE-26 co-rotating 26 mm twin screw extruder with an L/D ratio of 44:1 was used for reactive extrusion. The temperature profile used on the extruder from the feed section to the die section was as follows: 170/175/180/180/180/185/185/185/185/185/185° C. The screw speed and throughput were 100 rpm and 150 g/min respectively. The extrudate in the form of a strand was quenched by passing through a cold-water bath and then pelletized. The pellets were dried in a vacuum oven for 24 hours to remove moisture. This process has the advantages of being a continuous reactive extrusion process and, importantly, does not require any solvent. Moreover, the reaction time was only 2 to 3 minutes. The FLA-copolymers obtained from 3001D and 3100HP were called as 3001D copolymer and 3100HP copolymer, respectively.

In order to confirm reaction chemistry, a small amount of 3100HP copolymer was purified. A purification step was used to remove unreacted NHPDMS. A small amount of 3100HP copolymer was dissolved in dichloromethane (DCM). Both PLA and NHPDMS were soluble in DCM. Methanol was added to precipitate PLA and the 3100HP copolymer, leaving unreacted NHPDMS in the liquid phase. PLA and the 3100HP copolymer were separated by filtration. This procedure was repeated twice to purify 3100HP copolymer from unreacted NHPDMS.

In order to achieve the above-noted elongation and especially the improved notched Izod impact toughness properties, it is required that the PLA homopolymers and the PLA-copolymers having a flexible middle segment be mixed at their melting temperatures and molded with either a cold or hot mold and further that the cold molded mixed blends, or the cold molded PLA-copolymer per se, be annealed at hot temperatures as set forth hereinbelow. The synthesized PLA-copolymers were directly used with neat PLA (PLA homopolymer) for injection molding without any purification. The tensile and impact specimens needed to study the mechanical behavior of 3001D copolymer blends were prepared using a Toshiba EC85SX (Toshiba Machine Co., USA) injection molding machine. The barrel (mixing) and the mold temperature were set at 190° C. and 24° C. The mixing temperatures for the PLA-homopolymer-PLA-copolymer blends were from about 160° C. to about 220° C., desirably from about 170° C. to about 200° C., and preferably from about 175° C. to about 195° C. The injection pressure was 330 psi and the holding time was ~30 s. Since when the mold temperature was around room temperature, the injection molded test bars were labelled as cold molded (C) samples that are set forth in the various tables. The mold temperature for cold molding was from about 15° C. to about 40° C., desirably from about 20° C. to about 30° C., and preferably from about 23° C. to about 27° C. These PLA-homopolymer-PLA-copolymer blend samples were not completely crystallized and hence a thermal annealing step was introduced to increase the crystallinity of PLA-homopolymer-PLA-copolymer blend samples. This was achieved by placing the injection molded tensile as well as impact samples in a uniformly heated oven at 95° C. for an hour. The blend samples were placed on a flat tray and carefully removed after an hour. The blend samples were allowed to cool down slowly to room temperature. These blend samples were called as annealed (A) samples that are set forth in the various tables. Since the molding and annealing were carried out separately and not in the same machine, e.g. an injection molding machine and oven, this procedure is called a two-step process where samples were injection molded initially and then (later, subsequently) thermal annealing was performed separately. Such annealing temperatures were from about 60° C. to about 130° C., desirably from about 80° C. to about 110° C., and preferably from about 95° C. to about 105° C. The annealing time was from about 20 seconds to 600 seconds, desirably from about 20 to about 120 seconds, and preferably from about 20 seconds to about 40 seconds.

The tensile and impact specimens of 3100HP copolymer blends were prepared using a Toshiba EC100SX (Toshiba Machine Co., USA) injection molding machine. The barrel temperature was set at 190° C., and mold temperatures were 25° C. for cold molded (C) blend samples and 100° C. for hot molded (H) blend samples. The injection pressure used was 700 psi, and holding time was ~30 s for cold molded (C) samples and 75 s for hot molded (H) samples. The cold molded (C) samples were not completely crystallized, nor were they annealed and hence are not a part of the present invention since they were not annealed.

In the hot molding one-step process, wherein mixing and annealing were carried out in the same machine, e.g. an injection molding machine, the blend of the FLA homopolymers and the 3100HP copolymers having PLA end groups and a difunctional flexible middle segment were molded at an elevated mold temperature such as close to the crystallization temperature of the PLA-copolymer and homopolymer, for a long period of time to ensure complete crystallization. The mixing temperatures for the PLA-homopolymer-PLA-copolymer blends, as noted, were from about 160° C. to about 220° C., desirably from about 170° C. to about 200° C., and preferably from about 175° C. to about 195° C. The present invention also relates to injection molding the PLA-homopolymer-PLA-copolymer blends in a hot mold wherein thermal annealing was performed inside the mold, i.e. in situ. The annealing temperatures or hot mold temperatures of this one-step process was also the same as noted above, that is from about 60° C. to about 130° C., desirably from about 80° C. to about 110° C., and preferably from about 95° C. to about 105° C. As stated above, the annealing time inside the mold was from about 20 seconds to 600 seconds, desirably from about 20 to about 120 seconds, and preferably from about 20 seconds to about 40 seconds.

Regardless of the method of making the PLA-homopolymers-PLA-copolymer blend of the present invention, the final amount of the flexible segment in the blend was as noted above, that is from about 0.5 wt. % to about 10 wt. %, desirably from about 0.5 wt. % to about 5 wt. %, and preferably from about 1 wt. % to about 2 wt. %.

Another embodiment of the present invention, although not preferred, simply relates to the utilization of the above-noted PLA-copolymer containing a flexible middle segment that, when annealed, has improved elongation and improved notched Izod impact toughness as noted herein above. Such PLA-copolymers per se also contain from about 0.5 wt. % to about 10 wt. %, desirably from about 0.5 wt % to about 5 wt. %, and preferably from about 1 wt. % to about 2 wt % of the flexible middle segment based upon the total weight of the PLA-copolymer.

All samples were allowed to equilibrate for at least 24 hours before testing was performed on them.

Characterization

The tensile and flexural testing was carried using an Instron model 3345B (Massachusetts, USA) with a mechanical testing fixture setup with a 5 kN load cell. The testing was carried out in accordance with ASTM D638-14 (Type I sample size) standard test methods for tensile properties (tensile strength, elongation at break, Young's modulus) of plastics. The rate of grip separation was set at 5 mm/min according to the ASTM D638 standard. The flexural testing was carried out in accordance with the ASTM D790-17 standard test methods for the flexural properties of unreinforced plastics and electrical insulating materials. The support span length was 50 mm and the rate of the crosshead motion was 1.35 mm/min.

The notched Izod impact properties were studied using a Tinius Olsen Model IT504 (Tinius Olsen, USA) pendulum impact tester equipped with a Tinius Olsen Model Impact 104 test controller. The testing was carried out in accordance with the ASTM D256 standard test method for determining the Izod pendulum impact resistance of plastics. The samples were notched using a Tinius Olsen Model 899 Specimen Notcher. The test specimen had dimension 63 mm×12.7 mm×3.18 mm and the notch was 2.54 mm deep. A minimum of six replicates was used to ensure the repeatability of the test data.

Fourier Transform Infrared Spectroscopy (FTIR) spectra were acquired on a Varian 640-IR instrument (Agilent Technologies, California, USA). The FTIR spectra were recorded on 3100HP (neat PLA) and the purified 3100HP copolymer film samples. The thermal degradation properties of neat PLA (3100HP), aminopropyl terminated polydimethylsiloxane, 3100HP copolymer, and purified 3100HP copolymer samples were studied using the thermogravimetric analyzer, Discovery TGA (TA Instruments, USA), by heating the sample from room temperature to 600° C. at the rate of 5° C./min under nitrogen atmosphere. Also, the thermal transitions i.e. enthalpy of cold crystallization ($\Delta H_{cc}$) and enthalpy of melt crystallization ($\Delta H_m$) of the PLA-homopolymer-PLA-copolymer blend samples were obtained by using a differential scanning calorimeter, Discovery DSC (TA Instruments, USA). The PLA-homopolymer-PLA-copolymer blend samples were heated from room temperature to 200° C. at a heating rate of 10° C./min under a nitrogen atmosphere. The crystallinity given in Table 1 of the PLA-homopolymer-PLA-copolymer blend samples was calculated according to the following formula, $$\text{Crystallinity}(\%) = \frac{(\Delta H_m - \Delta H_{cc})}{\Delta H_m \text{ of } 100\% \text{ crystalline } PLA} \times 100$$

Where $\Delta H_m$ is enthalpy of melting and $\Delta H_{cc}$ is enthalpy of cold crystallization. The enthalpy of melting for 100% crystalline PLA was obtained from literature and is 93 J/g.

Result and Discussion

Figure 1:
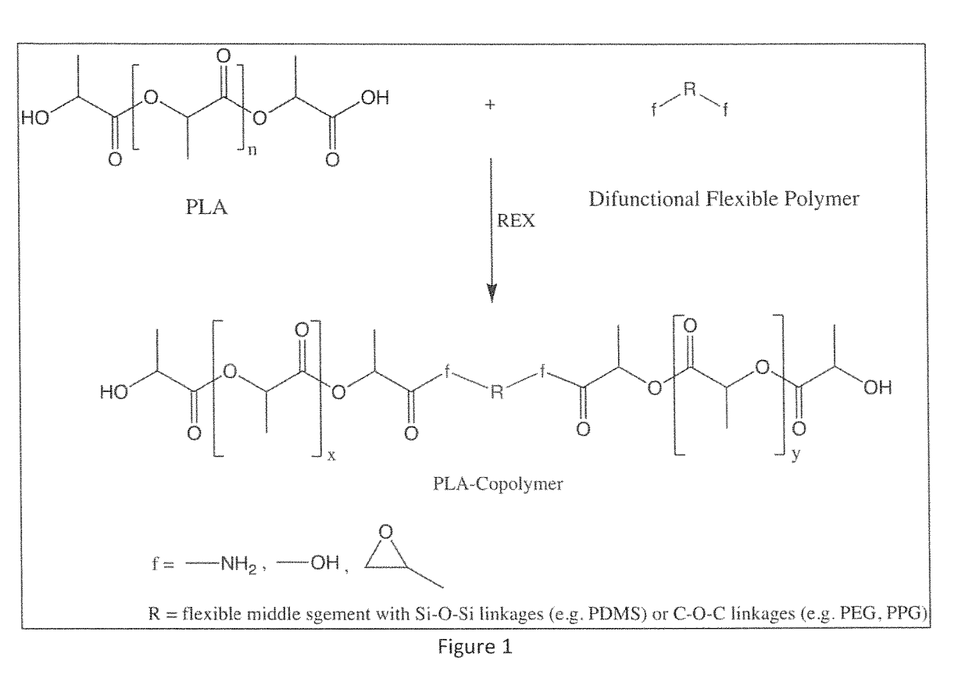
FIG. 1 shows the synthesis of a PLA-copolymer having a polysiloxane flexible segment or a polyether flexible segment using reactive extrusion (REX)

Poly(lactic acid) (PLA) is a polyester containing ester bonds with acid and hydroxyl end groups. The acid end groups can react with the epoxy end groups, for example of a difunctional flexible polymer forming a PLA-copolymer. The hydroxyl group (OH) or amino group ($NH_2$) of a difunctional flexible polymer can also attack the ester bonds of PLA forming a PLA-copolymer with new ester or amide linkages in it. The possible structure of the PLA-copolymer is given in FIG. 1.

Hazer et al., "Synthesis of polylactide-b-poly (dimethyl siloxane) block copolymers and their blends with pure polylactide", Journal of Polymers and the Environment, (2012) Vol. 20, No. 2, pp. 477-484, have synthesized PLA-based copolymer. The transesterification reaction was carried out between amine functionalized PDMS (25-60 wt. %) and PLA in chloroform solution at a temperature of about 60° C. to about 70° C. for 3 hours as compared to the present invention typically having a reaction time of only 2 or 3 minutes. After completion of reaction, the Hazer's copolymer containing 25 wt. % to 60 wt. % of PDMS and PLA homopolymers were precipitated by adding methanol to the solution. The properties of pure PLA-copolymer and blends of PLA-copolymer with neat PLA were studied for film applications. This process is three-hour long batch process which involves use of chloroform as a solvent, which is hazardous in nature. It also involves precipitation and separation steps for PLA-copolymer synthesis.

However, according to the present invention, the PLA-copolymer was synthesized as by, e.g. made in situ, using a heated mixing device, or machine, for example, reactive extrusion (REX) such as in a twin screw extruder, or a continuous mixer with single screw extruder for pelletization. As previously noted, this procedure completely eliminates the use of any solvent and reduces the reaction time significantly to about 2 to about 3 minutes. In other words, the in-situ reaction is absent or free of, that is based upon the total weight of the PLA homopolymer and PLA-copolymer blend, contains less than about 5 wt. %, less than about 2 wt. %, and preferably nil or none, or no solvent whatsoever.

With this process, the PLA-copolymer can be synthesized continuously in a single step. Also, this process is economically viable for commercial production of the PLA-copolymer. Suitable temperatures for reactive extrusion, i.e. formation, of the PLA-copolymer is from about 140° C. to about 220° C., desirably from about 160° C. to about 190° C., and preferably from about 170° C. to about 185° C.

Figure 2:
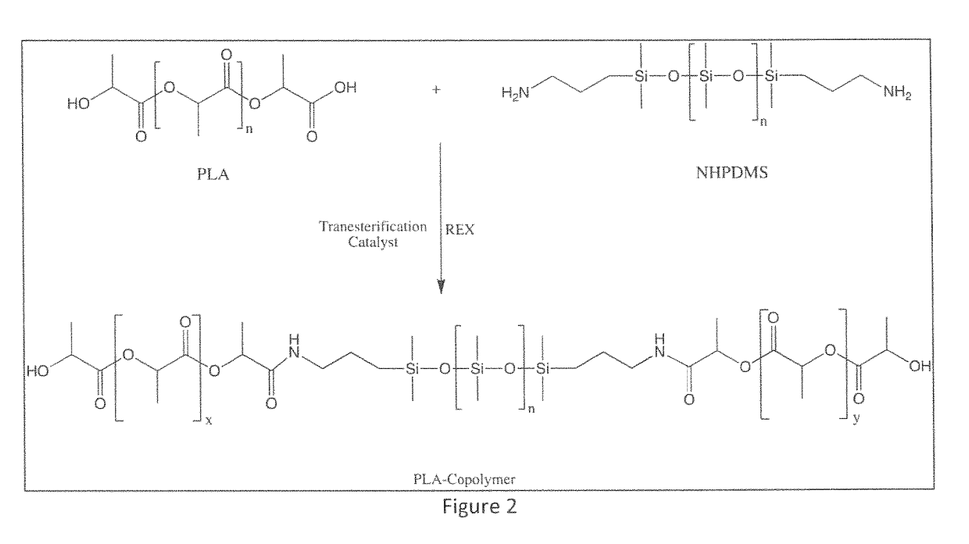
FIG. 2 shows the synthesis of a PLA-copolymer using a transesterification reaction between polylactic acid) (PLA) and an aminopropyl terminated polydimethylsiloxane (NHPDMS)

For example, the transesterification reaction between aminopropyl terminated polydimethylsiloxane (NHPDMS) and PLA homopolymer forming the PLA-copolymer is shown in FIG. 2. In this case, the difunctional flexible polymer is aminopropyl terminated polydimethylsiloxane (NHPDMS) with siloxane (Si—O—Si) as a flexible segment and amine ($NH_2$) as a functional group. The amino groups of NHPDMS breaks ester bonds of the PLA forming new amide linkages. The final product is a PLA-copolymer made by reactive extrusion process that contains PLA end groups and a difunctional flexible middle segment, i.e. NHPDMS. It might also contain small amounts of unreacted NHPDMS.

Figure 3:
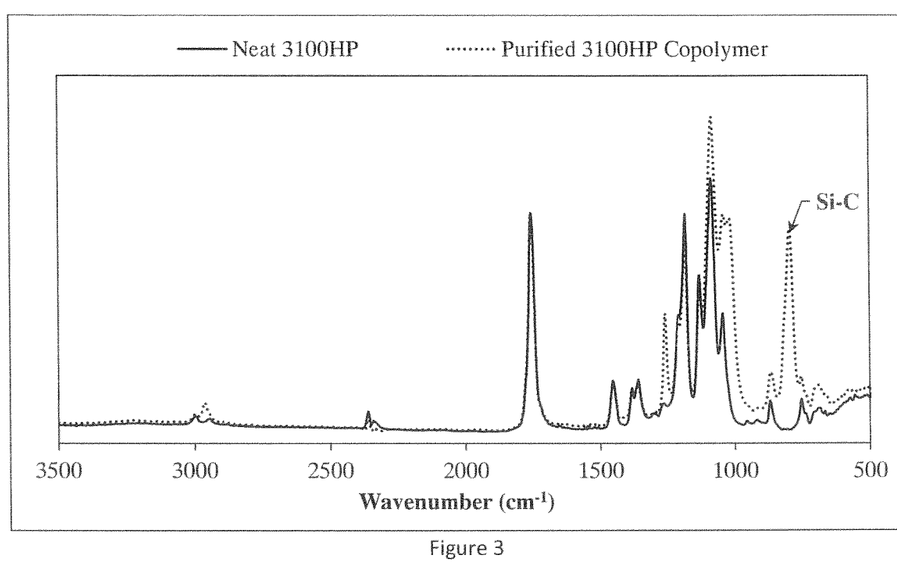
FIG. 3 shows the thermogravimetric analysis of PLA (3100HP), NHPDMS, 3100HP copolymer, and purified 3100HP copolymer.

The chemistry shown in FIG. 2 was confirmed by removing unreacted NHPDMS from the PLA-copolymer. The purified 3100HP copolymer was then further characterized. Thermogravimetric analysis (TGA) graphs of neat PLA (3100HP), NHPDMS, 3100HP copolymer, and the purified 3100HP copolymer are shown in FIG. 3. Neat PLA 3100HP degrades around 375° C. in a single degradation stage. Whereas aminopropyl terminated PDMS (NHPDMS) starts degrading around 100° C. with the peak degradation temperature ~500° C. The PLA-copolymer, as well as the purified PLA-copolymer, degrade over two degradation stages i.e. stage I (250-350° C.), stage II (350-550° C.). The second degradation stage present in the TGA of purified 3100HP copolymer could be due to the reacted NHPDMS or the PLA-PDMS chains.

Figure 4:
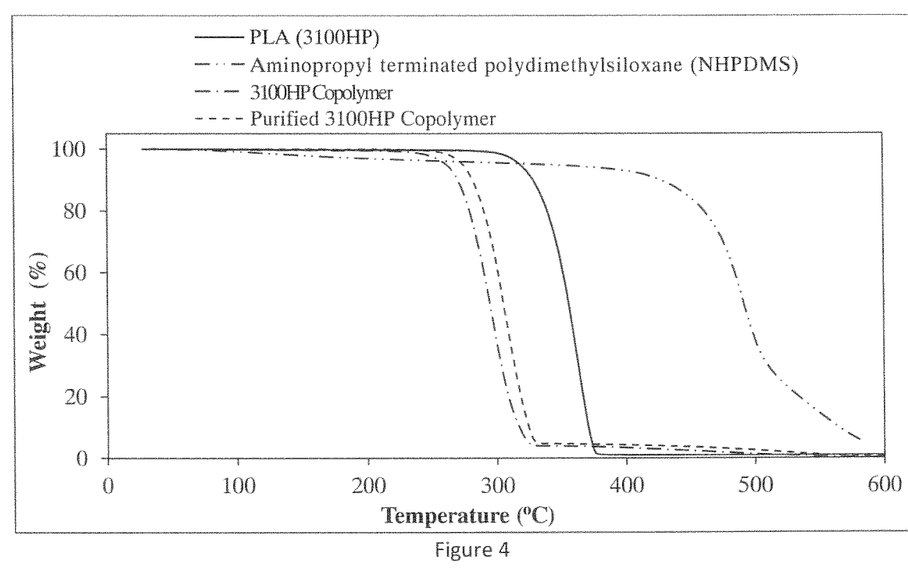
FIG. 4 shows the FTIR of PLA (3100HP) and purified 3100HP copolymer.

The Fourier Transform Infrared Spectroscopy (FTIR) spectra of neat 3100HP and purified 3100HP copolymer are shown in FIG. 4. The peak around 800 $cm^{-1}$ present in the FTIR of purified PLA-copolymer corresponds to the Si—C linkages present in the NHPDMS. This confirms reaction of NHPDMS with PLA forming PLA-PDMS copolymer.

The thermal transitions i.e. enthalpy of cold crystallization and enthalpy of melting observed in the DSC samples are given in Table 1.

TABLE 1

Thermal transitions observed in the DSC of cold molded (C), hot molded (H), and annealed (A) samples

| Sample | Enthalpy of cold crystallization ($\Delta H_{cc}$) | Enthalpy of melt crystallization ($\Delta H_m$) | Crystallinity (%) |
|---|---|---|---|
| Neat 3001D-C | 17.66 | 36.04 | 19.62 |
| Neat 3001D-A | 0.00 | 33.56 | 36.09 |
| 3001D-PDMS-050-C | 37.37 | 35.19 | — |
| 3001D-PDMS-050-A | 0.00 | 35.57 | 38.25 |
| 3001D-PDMS-100-C | 38.65 | 34.60 | — |
| 3001D-PDMS-100-A | 0.00 | 42.82 | 46.04 |
| 3001D-PDMS-150-C | 41.27 | 34.99 | — |
| 3001D-PDMS-150-A | 0.00 | 40.49 | 43.54 |
| 3100HP-PDMS-001-C | 24.44 | 56.72 | 35.06 |
| 3100HP-PDMS-001-H | 0.00 | 53.22 | 57.80 |
| 3100HP-PDMS-051-C | 21.77 | 54.39 | 35.61 |
| 3100HP-PDMS-051-H | 0.00 | 55.16 | 60.21 |
| 3100HP-PDMS-101-C | 20.60 | 55.28 | 38.06 |
| 3100HP-PDMS-101-H | 0.00 | 53.21 | 58.38 |

The 3001D copolymer containing 5 wt. % of NHPDMS was used as a masterbatch that was added to PLA-homopolymer to prepare PLA-homopolymer-PLA-copolymer blends containing 10 wt. %, 20 wt. %, and 30 wt. % of the 3001D copolymer for injection molding. The resulting PLA-homopolymer-PLA-copolymer blends containing 0.5 wt. %, 1 wt. %, and 1.5 wt. % of NHPDMS were labelled as 3001D-PDMS-050, 3001D-PDMS-100, and 3001D-PDMS-150, respectively. These samples were cold molded (C) samples and hence they were not completely crystallized. Thus, a thermal annealing (A) step was introduced in order to eliminate any cold crystallization ($\Delta H_{cc}$) present in the samples, thereby increasing their percent crystallinity as shown in Table 1.

In similar manner, 3100HP copolymer was used as a masterbatch to prepare PLA-homopolymer-PLA-copolymer blends containing 10 wt. %, 20 wt %, and 30 wt. % of the 3100HP copolymer. Along with that 10 wt. % of talc masterbatch (10 wt. % talc in 90 wt. % 3100HP) was added which acts as a nucleation site thereby aiding the crystallization process. The total amount of the talc in the PLA-copolymer-PLA-homopolymer blend was from about 0.5 wt. % to 5.0 wt. %, desirably from about 0.5 wt. % to about 2.5 wt. %, and preferably from about 1.0 wt. % to about 1.5 wt. %. The resulting PLA-homopolymer-PLA-copolymer blends containing 0 wt. %, 0.5 wt. %, 1 wt. %, and 1.5 wt. % of NHPDMS were labelled as 3100HP-PDMS-001, 3100HP-PDMS-051, 3100HP-PDMS-101, and 3100HP-PDMS-151, respectively. The injection molding of different blends was done with cold mold (C) and hot mold (H). The tensile test bars weighed 10.2 grams, the flexural test bars weighed 6.3 grams, and the impact test bars weight 3.1 grams. In cold molding, the samples were held at 25° C. for 30 s. These samples were not completely crystallized. Whereas in hot molding, samples were held inside the mold at about 100° C. for about 75 s to completely crystallize PLA in the presence of a nucleating agent such as talc. All hot molded samples were completely crystallized and have higher crystallinity than the cold molded samples. That is, the crystallinity of all completely crystallized samples was from about 30% to about 65%, desirable from about 30% to about 60%, and preferably from about 40% to about 60%.

The thermal annealing of the PLA-homopolymer-PLA-copolymer blends of the present invention can be performed either inside a heated chamber or inside a heated mold at temperatures of from about 60° C. to about 130° C., desirably from about 80° C. to about 110° C., and preferably from 95° C. to about 105° C. for times of about 20 to about 600 seconds, desirably from about 20 to about 120 seconds, and preferably from about 20 to about 40 seconds.

The notched Izod impact strength of 3001D copolymer and 3100HP copolymer blend formulations are given in Table 2. The addition of NHPDMS has no visible effect on the impact properties for cold molded (C) samples. But the annealed (A) (two-step process) and hot molded (H) (single step process) samples containing NHPDMS unexpectedly showed significant improvement in the impact properties compared to neat PLA as well as cold molded samples. The impact strength of annealed sample containing 1.5 wt. % of NHPDMS (3001D-PDMS-150-A) was four times higher than the impact strength of annealed neat PLA (3001D-000-A). The impact strength of 3100HP-PDMS-151-H containing 1.5 wt. % of NHPDMS was twice of the impact strength of neat 3100HP-PDMS-001-H.

TABLE 2

Notched Izod impact strength of 3001D copolymer and 3100HP copolymer blend formulations

| Sample | Notched Izod impact strength (kJ/m$^2$) | Improvement (%) |
| --- | --- | --- |
| Neat 3001D-000-C | 2.8 ± 0.1 | 0% |
| Neat 3001D-000-A | 4.0 ± 0.2 | 42% |
| 3001D-PDMS-050-C | 2.6 ± 0.1 | — |
| 3001D-PDMS-050-A | 11.4 ± 0.7 | 307% |
| 3001D-PDMS-100-C | 2.7 ± 0.1 | — |
| 3001D-PDMS-100-A | 13.4 ± 0.3 | 378% |
| 3001D-PDMS-150-C | 2.8 ± 0.1 | 0% |
| 3001D-PDMS-150-A | 16.5 ± 0.4 | 489% |
| Neat 3100HP-001-C | 3.1 ± 0.0 | 0% |
| Neat 3100HP-001-H | 3.8 ± 0.3 | 22% |
| Neat 3100HP-051-C | 3.1 ± 0.1 | 0% |
| Neat 3100HP-051-H | 6.4 ± 0.9 | 106% |
| 3100HP-PDMS-101-C | 3.1 ± 0.1 | 0% |
| 3100HP-PDMS-101-H | 7.4 ± 0.7 | 138% |
| 3100HP-PDMS-151-C | 2.9 ± 0.1 | 0% |
| 3100HP-PDMS-151-H | 8.9 ± 1.4 | 187% |

The tensile properties of 3001D copolymer blends are given in Table 3. It was observed that with an increasing amount of NHPDMS, the maximum tensile stress and the modulus of cold molded (C) samples decreased slightly without showing any effect on the elongation at break. However, after annealing (A), the samples showed an increase in the elongation at the break with an increase in the amount of NHPDMS.

TABLE 3

Tensile properties of neat 3001D, and 3001D copolymer blend formulations

| Sample Name | Maximum Tensile Stress (MPa) | Elongation at Break (%) | Tensile Stress at Break (MPa) | Modulus (Automatic Young's) (MPa) |
| --- | --- | --- | --- | --- |
| Neat 3001D-C | 76.8 ± 0.7 | 9.4 ± 0.5 | 76.8 ± 0.7 | 1521 ± 220 |
| Neat 3001D-A | 77.2 ± 1.0 | 10.2 ± 0.9 | 68.7 ± 2.2 | 1365 ± 141 |
| 3001D-PDMS-050-C | 74.3 ± 0.8 | 8.8 ± 0.5 | 67.8 ± 6.3 | 1386 ± 134 |
| 3001D-PDMS-050-A | 72.4 ± 0.5 | 14.6 ± 3.4 | 59.3 ± 2.8 | 1555 ± 188 |
| 3001D-PDMS-100-C | 73.2 ± 0.3 | 9.2 ± 0.5 | 61.7 ± 7.3 | 1364 ± 81 |
| 3001D-PDMS-100-A | 70.6 ± 0.8 | 11.9 ± 2.1 | 58.7 ± 2.2 | 1559 ± 180 |
| 3001D-PDMS-150-C | 71.3 ± 0.5 | 9.0 ± 0.5 | 58.8 ± 10.7 | 1316 ± 82 |
| 3001D-PDMS-150-A | 67.5 ± 0.5 | 25.5 ± 5.3 | 51.9 ± 1.7 | 1357 ± 41 |

The PLA-homopolymer-PLA-copolymer blends prepared using 3100HP copolymer showed a similar trend which was observed in 3001D copolymer blends as shown in Table 4. The elongation at break for hot molded (H) samples improved significantly after the addition of NHPDMS in PLA as compared to neat 3100HP. The minimal loss of modulus as well as maximum tensile stress was observed with increasing concentration of NHPDMS. The flexural properties of 3001D copolymer and 3100HP copolymer blend formulations are given in Table 5 and Table 6, respectively. It was observed that the addition of NHPDMS has a negligible effect on the flexural properties. However, the increased crystallinity after annealing or hot molding of samples increases the modulus as well as the flexural stress of all samples.

TABLE 4

Tensile properties of neat 3100HP and 3100HP copolymer blend formulations

| | Maximum Tensile Stress (MPa) | Elongation at Break (%) | Tensile Stress at Break (MPa) | Modulus (Automatic Young's) (MPa) |
|---|---|---|---|---|
| 3100HP-PDMS-001-C | 69.4 ± 0.5 | 9.8 ± 0.5 | 58.8 ± 0.5 | 1699 ± 6 |
| 3100HP-PDMS-001-H | 71.1 ± 0.4 | 5.7 ± 0.4 | 66.6 ± 1.2 | 1846 ± 11 |
| 3100HP-PDMS-051-C | 67.7 ± 0.2 | 12.9 ± 2.4 | 54.3 ± 1.6 | 1719 ± 22 |
| 3100HP-PDMS-051-H | 66.8 ± 0.4 | 13.6 ± 5.1 | 55.0 ± 1.4 | 1955 ± 10 |
| 3100HP-PDMS-101-C | 66.8 ± 0.7 | 11.5 ± 3.5 | 53.1 ± 3.0 | 1682 ± 9 |
| 3100HP-PDMS-101-H | 64.5 ± 0.5 | 22.5 ± 1.5 | 51.5 ± 0.5 | 1849 ± 13 |
| 3100HP-PDMS-151-C | 65.1 ± 0.4 | 16.0 ± 1.6 | 49.3 ± 1.0 | 1495 ± 51 |
| 3100HP-PDMS-151-H | 64.3 ± 1.0 | 27.0 ± 3.8 | 45.9 ± 2.7 | 1611 ± 32 |

TABLE 5

Flexural properties of 3001D copolymer blend formulations

| Sample Name | Flexure Stress at Max Force (MPa) | Modulus (Automatic Young's) (MPa) | Maximum Force (N) | Flexure Strain at Break (%) |
|---|---|---|---|---|
| Neat 3001D-NA | 97.7 ± 1.3 | 3658 ± 83 | 82.1 ± 1.1 | 3.9 ± 0.4 |
| Neat 3001D-A | 107.3 ± 3.6 | 4215 ± 127 | 90.2 ± 3.1 | 4.0 ± 0.5 |
| 3001D-PDMS-050-NA | 94.0 ± 2.6 | 3341 ± 77 | 77.8 ± 2.1 | 3.9 ± 0.4 |
| 3001D-PDMS-050-A | 103.6 ± 2.3 | 4154 ± 72 | 83.6 ± 1.0 | 3.5 ± 0.2 |
| 3001D-PDMS-100-NA | 94.8 ± 1.3 | 3414 ± 43 | 78.6 ± 1.1 | 3.7 ± 0.3 |
| 3001D-PDMS-100-A | 100.5 ± 1.7 | 4200 ± 108 | 81.9 ± 1.4 | 3.5 ± 0.3 |
| 3001D-PDMS-150-NA | 93.6 ± 1.6 | 3459 ± 116 | 77.7 ± 1.3 | 3.7 ± 0.2 |
| 3001D-PDMS-150-A | 97.5 ± 0.9 | 4102 ± 118 | 79.5 ± 0.7 | 3.3 ± 0.3 |

TABLE 6

Flexural properties of 3100HP copolymer blend formulations

| Sample Name | Flexure Stress at Max Force (MPa) | Modulus (Automatic Young's) (MPa) | Maximum Force (N) | Flexure Strain at Break (%) |
|---|---|---|---|---|
| 3100HP-PDMS-001-C | 104.7 ± 1.5 | 3865 ± 43 | 175.6 ± 2.6 | 6.1 ± 0.1 |
| 3100HP-PDMS-001-H | 93.7 ± 2.1 | 4568 ± 22 | 157.9 ± 3.6 | 3.2 ± 1.4 |
| 3100HP-PDMS-051-C | 99.9 ± 1.9 | 3892 ± 77 | 167.6 ± 3.2 | 6.4 ± 0.7 |
| 3100HP-PDMS-051-H | 99.2 ± 2.7 | 4619 ± 45 | 166.4 ± 4.5 | 4.5 ± 0.4 |
| 3100HP-PDMS-101-C | 94.9 ± 1.8 | 3809 ± 37 | 159.1 ± 3.0 | 8.2 ± 0.1 |
| 3100HP-PDMS-101-H | 87.9 ± 1.5 | 4531 ± 78 | 147.0 ± 2.5 | 5.6 ± 0.8 |
| 3100HP-PDMS-151-C | 92.6 ± 2.6 | 4013 ± 87 | 155.0 ± 4.4 | 9.3 ± 0.1 |
| 3100HP-PDMS-151-H | 91.6 ± 0.7 | 4568 ± 38 | 153.3 ± 1.1 | 9.2 ± 0.0 |

SUMMARY

A copolymer of PLA was made that can be used as a toughening agent for different grades of PLA. The PLA-copolymer was obtained by reactively incorporating a difunctional flexible polymer such as NHPDMS in PLA-homopolymer using a commercially viable twin-screw extrusion process. Two different grades of PLA with varying D-content were used for preparing PLA-homopolymer-PLA-copolymer blends. Also, two different processes were followed for thermal annealing of samples in order to achieve complete crystallization of the injection molded samples. In the first method, the thermal annealing was done after injection molding whereas in the second method, thermal annealing was done in the same injection molding machine or inside hot mold. In all cases, a significant improvement was observed in the elongation at break and the notched Izod impact strength of the final injection molded sample which was independent of the process or the grade of PLA. Thus, this significant enhancement observed in the overall mechanical properties of the material was due to a synergistic effect of the addition of the difunctional flexible segments followed by the thermal annealing of PLA samples. In contrast, no improvement in notched Izod impact strength or in elongation at break was obtained where no thermal annealing occurred with respect to the PLA-homopolymer-PLA-copolymer blends of the present invention.

While in accordance with the patent statutes, the best mode and preferred embodiment have been set forth, the scope of the invention is not limited thereto, but rather by the scope of the attached claims.

What is claimed is:

1. An annealed PLA homopolymer-PLA-copolymer blend comprising:
   a poly(lactic acid) (PLA) homopolymer, and a PLA-copolymer having PLA end group segments and a difunctional flexible middle segment comprising a polysiloxane (Si—O—Si) backbone, said middle segment, independently, having two functional end groups comprising an amine ($NH_2$), or hydroxyl (OH), or a combination thereof, wherein said PLA homopolymer has a number average molecular weight of from about 50,000 to about 150,000 g/mol, and wherein said polysiloxane segment has a weight average molecular weight of from about 2,000 to about 50,000 g/mol;
   wherein the amount of said difunctional flexible polysiloxane polymer in said PLA-copolymer is from about 0.6 wt. % to about 20 wt. % based upon the total weight of said PLA-copolymer and wherein the amount of said poly(lactic acid) is from about 80 wt. % to about 99.4 wt. % based upon the total weight of said PLA-copolymer; and wherein the amount of said difunctional flexible polymer of said PLA-copolymer is from about 0.5 wt. % to about 10 wt. % based upon the total weight of said PLA homopolymer-PLA-copolymer blend; and said blend having a notched Izod impact strength of from about 5 kJ/m² to about 30 kJ/m² according to ASTM D256.

2. The PLA homopolymer-PLA-copolymer blend according to claim 1, wherein the crystallinity of said PLA homopolymer-PLA-copolymer blend is at least about 30%.

3. The PLA homopolymer-PLA-copolymer blend according to claim 2, wherein said PLA homopolymer has a number average molecular weight from about 60,000 to about 120,000 g/mol, and wherein said polysiloxane segment has a weight average molecular weight of from about 10,000 to about 40,000 g/mol, and wherein the crystallinity of said PLA homopolymer-PLA-copolymer blend is at least about 35%.

4. The PLA homopolymer-PLA-copolymer blend according to claim 3, wherein said notched Izod impact strength according to ASTM D256 is from about 6 kJ/m² to about 20 kJ/m², and wherein the amount of said difunctional flexible polymer of said PLA-copolymer is from about 0.6 wt. % to about 10 wt. %, based upon the total weight of said PLA-copolymer, and wherein the amount of said difunctional flexible polymer of said PLA-copolymer is from about 0.5 wt. % to about 5 wt. % based upon the total weight of said PLA homopolymer-PLA-copolymer blend.

5. The PLA homopolymer-PLA-copolymer blend according to claim 3, wherein said notched Izod impact strength according to ASTM D256 is from about 7 kJ/m² to about 12 kJ/m², wherein the amount of said difunctional flexible polymer of said PLA-copolymer is from about 0.6 wt. % to about 5 wt. % based upon the total weight of said PLA-copolymer, and wherein the amount of said difunctional flexible polymer of said PLA-copolymer is from about 1.0 wt. % to about 2 wt. %, based upon the total weight of said PLA homopolymer-PLA-copolymer blend.

6. The PLA homopolymer-PLA-copolymer blend according to claim 5, wherein said PLA homopolymer has a number average molecular weight of from about 60,000 to about 100,000 g/mol, wherein said polysiloxane segment has a weight average molecular weight of from about 25,000 to about 35,000 g/mol, and wherein the crystallinity of said PLA homopolymer-PLA-copolymer blend is at least about 40%.

7. The PLA homopolymer-PLA-copolymer blend according to claim 1, wherein said PLA-copolymer having a difunctional flexible middle segment was prepared by a thermal reaction via reactive extrusion.

8. The PLA homopolymer-PLA-copolymer blend according to claim 7, wherein said thermal reaction was carried in a twin screw co-rotating extruder at a temperature of from about 160° C. to about 220° C.

9. A composition comprising a transesterified, annealed, triblock PLA-copolymer comprising:
a polysiloxane block having high molecular weight PLA end blocks derived from a PLA homopolymer having a number average molecular weight of from about 50,000 to about 150,000 g/mol, and a difunctional flexible middle segment comprising a polysiloxane (Si—O—Si) backbone, said middle polysiloxane segment, independently, having two functional end groups comprising an amine (NH₂), said functional end groups thermally reacted via a transesterification reaction with said PLA blocks thereby forming said triblock copolymer; wherein the weight average molecular weight polysiloxane segment of said copolymer is from about 2,000 to about 50,000 gimol;
including a nucleating agent; and
wherein the amount of said difunctional polysiloxane flexible polymer in said triblock PLA-copolymer is from about 0.6 wt. % to about 20 wt. %; and said triblock copolymer has a notched Izod impact strength of from about 5 kJ/m² to about 30 kJ/m² according to ASTM D256.

10. The composition of claim 9, wherein said weight average molecular weight of said polysiloxane segment is from about 10,000 to about 40,000 g/mol, and wherein said nucleating agent is talc.

11. The composition of claim 10, wherein the weight average molecular weight of said polysiloxane segment is from about 25,000 g/mol to about 35,000 g/mol, wherein the amount of said polysiloxane segment is from about 0.6 wt. % to about 5 wt. %, and wherein said notched Izod impact strength of said triblock PLA-copolymer is from about 7 to about 12 KJ/m².

12. A process for preparing a transesterified triblock PLA-copolymer comprising: reacting a PLA homopolymer via a transesterification reaction with a difunctional polysiloxane (Si—O—Si), independently, having two functional end groups comprising an amine (NH₂), or hydroxyl (OH), or a combination thereof; at a temperature of from about 160° C. to about 220° C., whereby said PLA homopolymer is broken thereby forming said transesterified triblock PLA-copolymer, wherein the amount of said difunctional flexible middle segment is from about 0.6 wt. % to about 20 wt. % and the amount of said transesterified PLA polymers is from about 80 wt. % to about 99.4 wt. % of said triblock copolymer; and wherein said polysiloxane segment has a weight average molecular weight from about 10,000 g/mol to about 50,000 g/mol.

13. The process of claim 12, wherein said PLA homopolymer, independently, has a number average molecular weight of from about 50,000 to about 150,000 g/mol, and wherein said reaction is a continuous reaction that can occur in an extruder.

14. The process of claim 13, including a transesterification catalyst comprising stannous octoate, wherein the amount of said difunctional flexible middle polysiloxane segment is from about 0.6 wt. % to about 10 wt. % and the total amount of said transesterified PLA homopolymers is from about 90 wt. % to about 99.4 wt. %, wherein said reaction temperature is from about 160° C. to about 195° C., and wherein said difunctional flexible middle polysiloxane segment has a weight average molecular weight of from about 10,000 g/mol to about 35,000 g/mol.

15. The PLA homopolymer-PLA copolymer blend according to claim 14, wherein said reaction temperature is from about 170° C. to about 185° C., wherein the amount of said difunctional flexible middle segment is from about 0.6 wt. % to about 5.0 wt. % and wherein the amount of said PLA polymer is from about 95 wt. % to about 99.4 wt. %, and wherein the weight average of said polysiloxane segment is from about 25,000 to about 35,000 g/mol.

16. A process for preparing a PLA homopolymer-PLA-copolymer blend, comprising the steps of;
a) thermal mixing a polylactic acid) homopolymer, and a PLA-copolymer comprising PLA end group segments and a middle segment comprising a difunctional siloxane (Si—O—Si), said middle segments, independently, having two functional end groups comprising an amine (NH₂), hydroxyl (OH), or a combination thereof, at a temperature of from 160° C. to about 220° C. and molding in a cold mold having a temperature of from about 15° C. to about 40° C., and subsequently annealing said blend at a temperature of from about 60° C. to about 130° C.; or
b) thermal mixing and annealing a PLA homopolymer, and a PLA-copolymer comprising PLA end group segments and a middle segment comprising a difunctional siloxane (Si—O—Si) having two functional end groups comprising an amine (NH₂), hydroxyl (OH), or a combination thereof, said mixing ranging from a temperature of about from 160° C. to about 220° C. and said annealing temperature ranging from about 60° C. to about 130° C.; and
wherein the amount of said difunctional flexible polymer of said PLA-copolymer is from about 0.6 to about 20 wt. %, and wherein the amount of said difunctional flexible polymer is from about 0.5 wt. % to about 10 wt. % based upon the total weight of said PLA homopolymer-PLA-copolymer blend; and said PLA homopolymer-PLA-copolymer blend having a notched Izod impact strength of from about 5 kJ/m$^2$ to about 30 kJ/m$^2$ according to ASTM D256.

17. The process of claim 16, wherein said process is free of any solvent.

18. The process of claim 17, wherein said process a) step comprises cold molding of said PLA homopolymer-PLA-copolymer blend with a mold temperature of from about 20° C. to about 30° C., and wherein said subsequently thermal annealed temperature is from about 80° C. to about 110° C.

19. The process of claim 18, wherein the amount of said difunctional flexible middle segment is from about 0.6 wt. % to about 5.0 wt. % based upon the total weight of said PLA-copolymer, wherein said ASTM D256 notch Izod impact strength is from about 6 to about 20 kJ/m$^2$, wherein said PLA homopolymer has a number average molecular weight of from about 60,000 to about 120,000 g/mol, and wherein said PLA-copolymer middle segment is said polysiloxane having a weight average molecular weight of from about 10,000 to about 40,000 g/mol.

20. The process of claim 17, wherein said process a) step comprises cold molding of said PLA homopolymer-PLA-copolymer blend with a mold temperature of from about 23° C. to about 27° C., and subsequently thermal annealing at a temperature of from about 95° C. to about 105° C.

21. The process of claim 17, wherein said process b) step comprises annealing at a temperature of from about 80° C. to about 110° C.

22. The process of claim 21, wherein the amount of said difunctional middle segment is from about 0.6 wt. % to about 5.0 wt. % based upon the total weight percent of said PLA-copolymer, wherein said ASTM D256 notch Izod impact strength is from about 6 to about 20 kJ/m$^2$, wherein said PLA homopolymer has a number average molecular weight of from about 60,000 to about 120,000 g/mol, and wherein said PLA-copolymer middle segment is said polysiloxane having a weight average molecular weight of from about 10,000 to about 40,000 g/mol.

23. The process of claim 17, wherein said process step b) comprises annealing at a temperature of from about 95° C. to about 105° C.

24. The process of claim 17, wherein said process step b) comprises mixing at a temperature of from about 170° C. to about 200° C., and annealing at a temperature of from about 95° C. to about 105° C.

25. The process of claim 16, wherein the amount of said difunctional flexible middle segment is from about 0.6 wt. % to about 5.0 wt. % based upon the total weight of said PLA-copolymer, wherein said ASTM 0256 notch Izod impact strength is from about 6 to about 20 kJ/m$^2$, wherein said PLA homopolymer has a number average molecular weight of from about 60,000 to about 120,000 g/mol, and wherein said PLA-copolymer middle segment is said polysiloxane having a weight average molecular weight of from about 10,000 to about 40,000 g/mol.

\* \* \* \* \*

UNITED STATES PATENT AND TRADEMARK OFFICE
CERTIFICATE OF CORRECTION

| | |
|---|---|
| PATENT NO. | : 11,485,852 B2 |
| APPLICATION NO. | : 16/793529 |
| DATED | : November 1, 2022 |
| INVENTOR(S) | : Preetam Giri et al. |

It is certified that error appears in the above-identified patent and that said Letters Patent is hereby corrected as shown below:

In the Specification

In Column 3, Line 12, delete "FLA" and insert -- PLA --.

In Column 4, Line 55, delete "FLA" and insert -- PLA --.

In Column 5, Line 62, delete "FLA" and insert -- PLA --.

In the Claims

In Claim 9, Column 13, Line 54, delete "gimol" and insert -- g/mol --.

Signed and Sealed this
Thirteenth Day of December, 2022

Katherine Kelly Vidal
*Director of the United States Patent and Trademark Office*